April 29, 1947.   D. D. ORMSBY   2,419,911
AUXILIARY POWERED VEHICLE CONSTRUCTION
Filed Feb. 17, 1939   5 Sheets-Sheet 1

INVENTOR
DONALD D. ORMSBY.
BY Walter E. Schirmer
ATTORNEY

April 29, 1947.　　　　D. D. ORMSBY　　　　2,419,911
AUXILIARY POWERED VEHICLE CONSTRUCTION
Filed Feb. 17, 1939　　　5 Sheets-Sheet 3
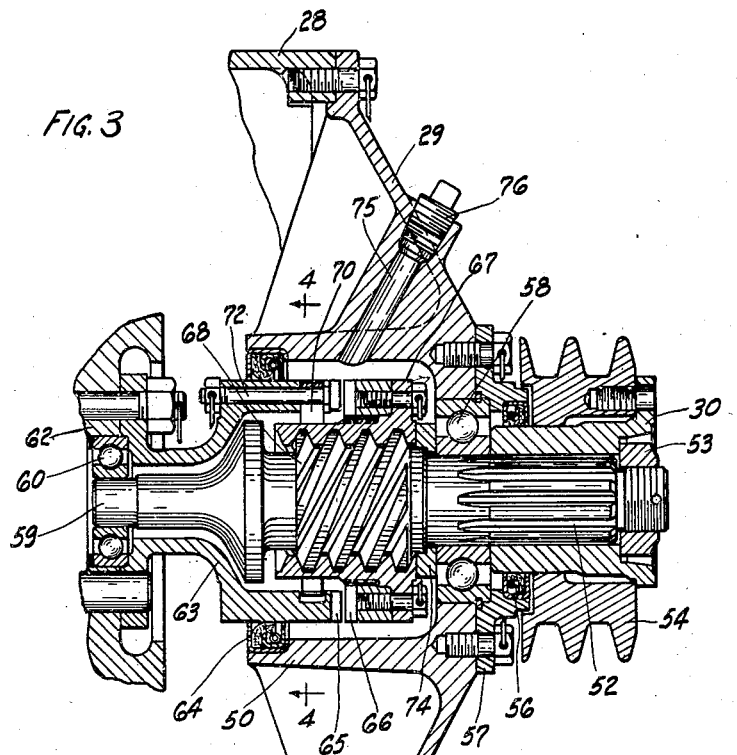
FIG. 3
FIG. 4
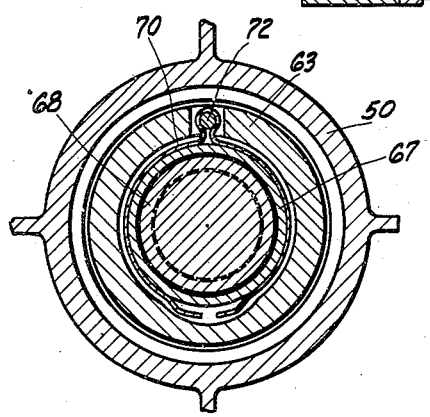
INVENTOR.
DONALD D. ORMSBY.
BY Walter E. Schismer
ATTORNEY.

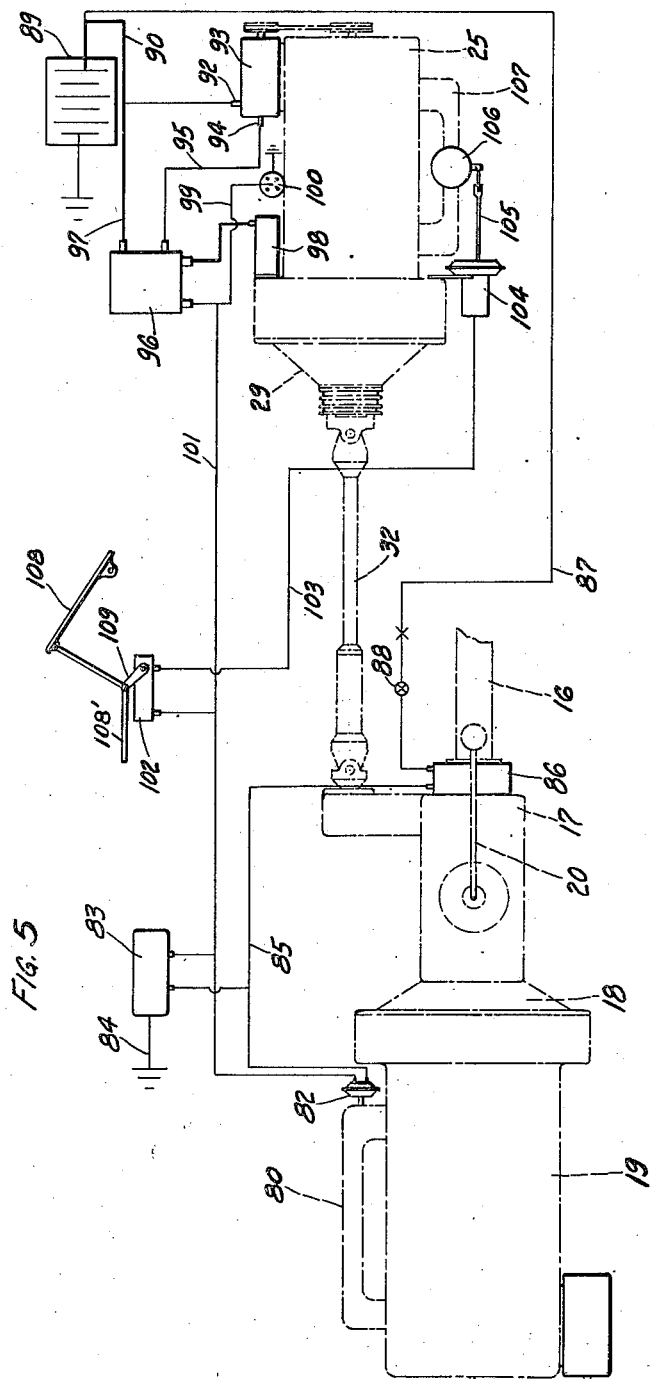

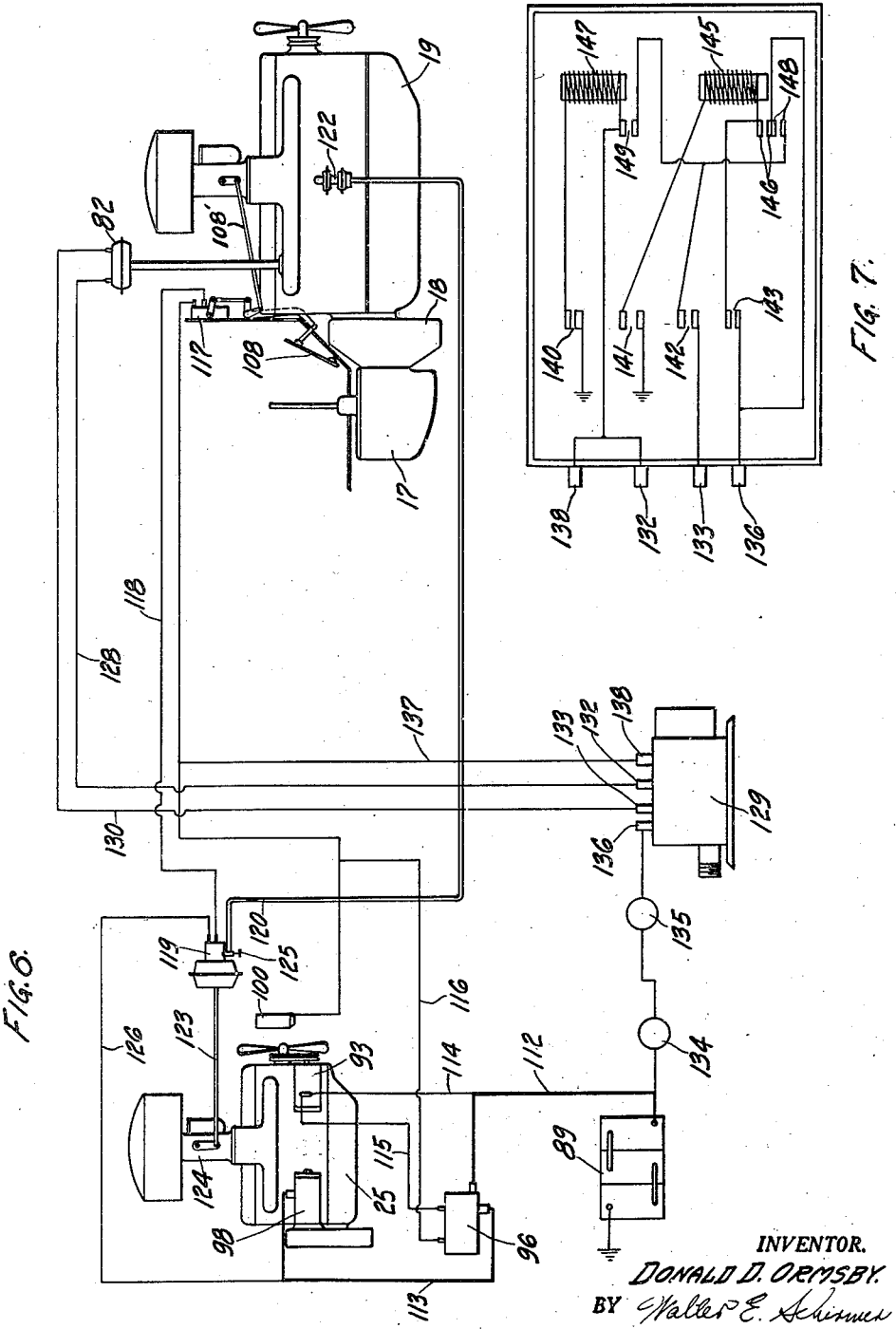

Patented Apr. 29, 1947

2,419,911

UNITED STATES PATENT OFFICE 2,419,911

AUXILIARY POWERED VEHICLE CONSTRUCTION

Donald D. Ormsby, Buchanan, Mich., assignor to Clark Equipment Company, Buchanan, Mich., a corporation of Michigan Application February 17, 1939, Serial No. 256,947

49 Claims. (Cl. 180—54)

This invention relates to vehicles, and more particularly is directed to an improved power drive combination for heavy duty vehicles, such as trucks, buses, rail cars and the like.

The present type of truck or bus now employed is powered to carry predetermined pay loads at fairly consistent speeds over level country. However, it is common knowledge that such vehicles are frequently over-loaded, and even when not overloaded, the power in such trucks is insufficient to produce an adequate speed of the vehicle in climbing grades or the like in hilly or mountainous country. As a result, such vehicles crawl up these grades at speeds which are so slow as to cause numerous accidents because of attempts by trailing vehicles to pass the slow moving bus or truck in going up hill. This occurs in spite of highway regulations prohibiting passing under such conditions due mainly to the extremely slow speed of the heavy loaded vehicle and the impatience of the operator of the trailing vehicle.

In attempting to overcome such a situation it has become increasingly apparent that the solution does not lie in trying to prevent passing under such conditions, but rather in speeding up the slow vehicle to a point where it will not unduly retard traffic on grades.

It is believed that speeds of twenty to thirty-five miles per hour, for example, would do much to eliminate the accidents, as at such speeds, traffic would not be impeded to an extent such as to cause disregard for the obvious dangers inherent in passing under such conditions.

One manner in which the speed of the transport vehicle could be increased in climbing grades would be to install larger and more powerful engines therein adequate to maintain the desired speed on grades. However, this is impractical since it would produce uneconomical operation of the power unit under normal driving conditions on flat terrain and the available power would be utilized only occasionally.

One manner of solving this problem has been disclosed in the copending application of George D. Wilcox, Serial No. 246,565, filed December 19, 1938. The present application is considered to be an improvement upon the aforesaid copending application to render the same more positive in operation and to simplify the control system thereof.

Primarily, the present invention is to provide a secondary or booster power unit capable of being coupled into the power train of the vehicle and arranged under automatic control for delivering its full power to the driving mechanism to supplement the main drive under certain predetermined conditions.

It is essential in order to gain the greatest benefit from such a system that the auxiliary or booster engine be controlled in response to predetermined speed and power requirements in the vehicle so that it will be operated only at such times as its power is necessary to maintain a predetermined speed of the vehicle.

One of the primary features of the present invention is the provision of an overrunning clutch between the booster engine unit and its connection into the drive train. By reason of such a construction, the booster engine can be brought up to full speed and automatically clutched to the driving train without any control on the part of the operator.

Still another feature of the present invention is the provision of a switch mechanism controlled from the accelerator pedal of the main or primary engine, which is operable to provide for a gradual opening of the throttle of the booster engine only when the booster engine is being rotated under its own power. This mechanism comprises a solenoid operated accelerator connected to the carburetor of the booster engine and controlled from the accelerator switch actuated by the accelerator pedal of the main engine. Actually, the control is so arranged that the accelerator pedal must be depressed a predetermined amount before the accelerator switch can be closed, and the circuit is not completed unless the starting circuit for the booster engine is also energized at the same time.

The control for the starting circuit for the booster engine is dependent upon a relay responsive to the speed of the main motor. This relay is put into the circuit in parallel with a manifold switch controlled by the manifold pressure in the intake manifold of the primary engine. When the intake manifold pressure is such as to actuate the manifold switch and the speed of the vehicle is such as to cause the relay to close the circuit, the starting circuit of the booster engine is energized and the booster engine is brought up to speed providing the accelerator pedal is depressed beyond a predetermined amount. A suitable governor mechanism is provided which cuts out the ignition circuit whenever the speed of the vehicle moves above a predetermined maximum, thus de-energizing the booster engine when the speed of the vehicle is such that the additional torque of the booster engine is no longer required.

Another feature of the present invention is the provision of a control for regulating the speed at which the carburetor opens and which is responsive to the operation of the accelerator switch. This control is actuated through a combination fuel and vacuum pump.

Another feature of the present invention is the provision of a control system which is entirely automatic in operation, which requires little or no change in the chassis of the vehicle for installation purposes and which does not affect the operation of the vehicle in its normal condition. The simplicity of this mechanism, as well as the design of the booster engine and connections therefrom to the power train of the vehicle are such as to produce a booster unit capable of manufacture at a cost very materially less than would be required for adding additional power in the way of a more powerful engine on the vehicle, which has the added disadvantage of uneconomical operation throughout the major portion of the operating period.

Other objects and advantages of the present invention will be more apparent from the following detailed description which, taken in conjunction with the accompanying drawings, will disclose to those skilled in the art the particular construction and operation of a preferred form of the present invention.

In the drawings:

Figure 3 is a sectional view through the overrunning clutch construction;

Figure 4 is a sectional view taken substantially on line 4—4 of Figure 3;

Figure 5 is a diagrammatic view of one form of control system;

Figure 6 is a diagrammatic view of a modification of the control system of Figure 5; and Figure 7 is a diagrammatic view of the governor control mechanism.

Figure 1:
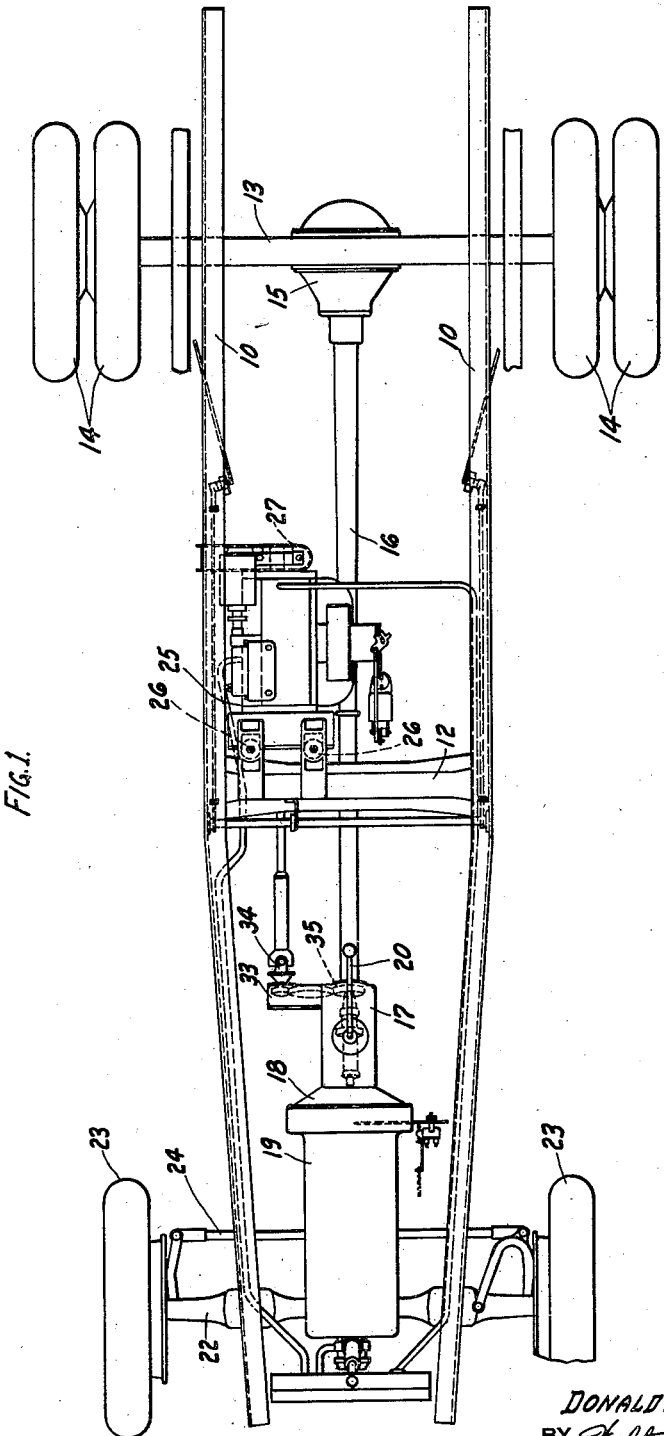
Figure 1 is a top plan view of a chassis embodying the present invention.
Figure 2:
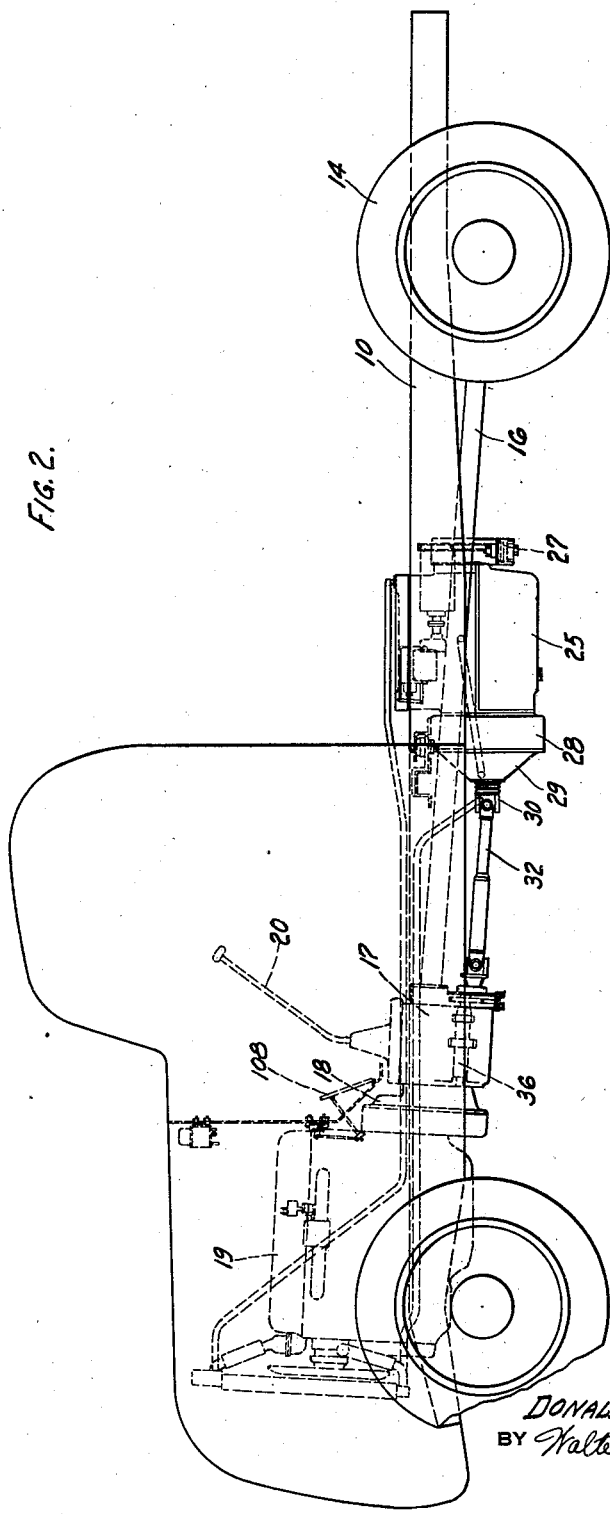
Figure 2 is an elevational view of the chassis shown in Figure 1.

Considering now the invention as shown in the drawings, a truck chassis, which may be either of the tractor or of the conventional type on which a truck body is to be mounted, is shown in Figures 1 and 2, and comprises the side rails 10 which are in the form of channels and which are tied together by means of a cross member such as the central cross member 12. At the rear portion of the chassis there is provided an axle housing 13 upon which the dual wheels 14 are mounted at each end and which are driven from an axle mechanism including a differential supported in the differential carrier 15.

Extending forwardly from the carrier 15 is a propeller shaft 16 which may, if desired, be of the torque tube type and which at its forward end is connected to the transmission 17 secured to the clutch housing bell 18 of the main or primary engine 19. The transmission 17 is provided with a conventional gear shift lever 20 utilized for shifting the transmission through the various speed changes.

At the front end of the chassis there is provided the front axle 22 suitably supporting the vehicle through spring members (not shown) and upon which are dirigibly mounted the front wheels 23 which have the steering knuckles thereof connected together by the tie rods 24 in a conventional manner.

A booster or secondary engine is indicated at 25 and is suitably supported upon the frame or chassis of the vehicle by means of rubber biscuits 26 carried in suitable brackets secured to the cross member 12 and by a resilient mounting 27 at the front end of the motor 25 which is secured to the side rail 10. At its rear end the motor 25 is provided with a flywheel housing 28 to which is secured the bell shaped housing 29 of the overrunning clutch construction and from which extends the companion flange 30 of a universal joint assembly connected to the shaft 32. The shaft 32 is longitudinally extensible by means of a splined telescoping connection, and at its forward end is connected to a laterally offset housing 33 by means of the universal joint 34. The housing 33 is bolted to the side of the transmission 17 and contains suitable gears meshing with a gear 35 on the countershaft 36 of the transmission shown in dotted lines in Figure 2. It will thus be apparent that the booster engine 25 is connected through the overrunning clutch 29 to the countershaft of the transmission of the main power plant of the vehicle and thus delivers its torque to the driving train at this point. However, it is within the scope of the present invention to provide for connection of the booster engine at any point of the power train of the vehicle from the rear axle forwardly to the motor 19.

Considering now in further detail Figures 3 and 4 which show the overrunning clutch construction, the clutch housing 29 is piloted into the flywheel housing 28 of the auxiliary engine 25, as indicated clearly in Figure 3. The clutch housing 29 is bell-shaped and has a central journal portion 50 within which is disposed the overrunning clutch mechanism.

The companion flange 30 forming the universal joint connection to the lay shaft 32 is secured in splined engagement to the shaft 52 by means of the nut 53 threaded onto the reduced end of this shaft, as shown clearly in Figure 3. It will thus be apparent that the shaft 52 is constantly rotating whenever the main engine 19 is in operation.

It is apparent that the pulley 54 which is journalled over the hub portion of the companion flange 30 and is secured for conjoint rotation therewith will thereby be in constant rotation with the shaft 52, and consequently will drive any suitable mechanism at all times. Suitable shaft sealing means 56 is provided in a recessed portion of the bearing retaining plate 57 which supports the ball bearing 58 in position for journalling the shaft 52 for rotation within the housing 29. This sealing means prevents escape of oil outwardly of the bearing past the hub of the companion flange 30.

The opposite end of the shaft 52 is provided with a reduced stud portion 59 which is piloted in suitable bearings 60 located within the end 62 of the flywheel of the auxiliary engine. Secured to the end of the flywheel is a sleeve clutch portion 63 which extends about the shaft 52 and is sealed in the clutch housing journal portion 50 by means of the sealing member 64. The sleeve 63 is provided at its axial end with a series of ratchet teeth 65 which are adapted to be engaged by corresponding ratchet teeth 66 carried by the movable clutching member 67, which is mounted for axial movement on the relatively steep pitched threads 68 of the shaft 52. The sleeve 67 which rides upon the threads 68 of the shaft 52 is normally restrained against forward movement on the threads by means of a spring brake member 70 encircling the sleeve and frictionally engaging the same and held in position on the pin 72 extending through the sleeve 63. The brake 70 normally maintains the member 67 against rotation with shaft 52, thereby threading it axially outwardly against the thrust washer 74 which forms a stop therefor.

However, when the auxiliary engine 25 is started, the flywheel 62 comes up to speed, and consequently the effect of the braking force of the brake 70 on the sleeve 67 is reversed causing the sleeve to be threaded inwardly to engage the ratchet teeth 66 with the teeth 65, thereby clutching the shaft 52 and the auxiliary engine together whereby the auxiliary engine drives the shaft 52 and consequently the shaft 32. It will therefore be apparent that whenever the shaft 52 is overrunning with respect to the flywheel 62, as when the auxiliary engine is not in operation, the clutch will be disengaged, but when the auxiliary engine is brought up to operating speed it will tend to overrun the shaft 52, and consequently the sleeve 67 will be threaded inwardly to engage the clutch for coupling the shaft 32 to the auxiliary engine whereby the auxiliary engine may transmit its torque to the transmission of the vehicle. Suitable lubricating means for the clutch is provided by the lubricating duct 75 extending through a rib of the housing 29 and closed by the plug 76.

The overrunning clutch construction provides for automatically coupling the auxiliary engine to the lay shaft 32 whenever the speed of rotation of the auxiliary engine exceeds that of the lay shaft, thereby allowing a power input from the auxiliary engine to the transmission of the vehicle. The brake construction prevents such clutch engagement when the relative speeds of rotation are such that the shaft overruns the auxiliary engine. This insures that the auxiliary engine will not be coupled to the lay shaft during the time that it is coming up to speed, thereby preventing the overloading of the vehicle and consequent loss of power caused by the main engine having to assist in bringing the auxiliary engine up to speed.

Considering now in detail the control circuit shown diagrammatically in Figure 5, which shows one scheme for effecting automatic control of the operation of the auxiliary engine, the primary engine 19 has the customary intake manifold 80 to which is connected a manifold switch 82 responsive to the pressures within the manifold. Connected to one side of the switch 82 and in parallel therewith is a control relay 83 having the ground connection 84. The relay 83 is connected into the conductor 85 leading from one side of the manifold switch 82 to the terminal of a governor controlled switch 86 mounted adjacent the propeller shaft 16 and responsive to the speed thereof. From the other side of the governor switch the conductor 87 is extended leading through an ignition switch 88 and connected to one terminal of a battery 89 forming the power source for the auxiliary engine. From the same battery terminal conductor 90 is led to the generator terminal 92 of the generator 93 mounted on the auxiliary motor 25 and driven therefrom. Another terminal of the generator indicated at 94 is connected through the conductor 95 to one terminal of the starting box 96, which also has connected thereto a conductor 97 leading from the battery 89 in the usual manner. The starter motor itself is indicated at 98 and is connected to the starting box 96 in the customary manner with another terminal from the box 96 being connected through the conductor 99 to the high tension coil 100 of the ignition circuit for the auxiliary motor. A second conductor 101 is connected between the opposite side of the manifold switch 82 and the box 96, and has connected thereinto the opposite terminal of the control relay 83 and one terminal of an accelerator control switch 102. The accelerator control switch 102 has its opposite terminal connected through the line 103 to a solenoid operated control 104 connected through the arm 105 to the throttle valve 106 mounted on the intake manifold 107 of the auxiliary engine 25. The switch 102 is controlled by operation of the accelerator pedal 108 which is connected to the switch through the switch actuating arm 109 and to the throttle of the main engine 19 by a suitable linkage, part of which is indicated at 108'.

In the operation of the circuit thus far described, the ignition circuit for the auxiliary engine will not be energized unless the governor switch 86 is closed as well as the manifold switch 82 with the ignition switch 88, also closed as it normally is in operation of the main engine. This occurs when the vehicle has assumed a predetermined speed and is decelerating under certain conditions even with the accelerator pedal fully depressed. This means that the power of the main engine 19 is not sufficient to maintain the vehicle at the desired speed. As a result the manifold switch 82 closes due to the pressure conditions in the manifold 80 under full load conditions, energizing the circuit through conductor 101 to the ignition coil 100 and simultaneously closing a circuit through the battery and starting box to the starter motor 98, thereby starting the auxiliary engine 25. As the auxiliary engine comes up to speed under this influence of solenoid switch 104 acting on the throttle of carburetor 106, the generator cuts in and feeds current to the ignition circuit through conductor 87 and continues the operation of the auxiliary engine until such time as the accelerator pedal is released, which opens the circuit through manifold switch 82, or the speed increases above a predetermined amount which opens the circuit through the governor controlled switch 86. Either of these conditions, results in opening of the main circuit of the auxiliary engine, thereby shutting the same off inasmuch as occurrence of these conditions indicates that the main engine 19 is capable of operating the vehicle at the desired rate of speed.

The control circuit may be so arranged that under full load conditions with the accelerator depressed, when the vehicle approaches a lower limit of speed of say 20 miles per hour, the starting circuit is energized to start the auxiliary engine 25, which engine is brought up to speed immediately through the action of the solenoid accelerator control 104, the overrunning clutch being thereby engaged to couple the auxiliary engine to the transmission 17 for delivering torque thereto. When conditions are such that the combined power of the two engines raises the speed of the vehicle over a predetermined maximum limit, the governor controlled switch 86 is de-energized opening the ignition circuit to the auxiliary engine and thereby stopping the auxiliary engine. This automatically declutches this engine from the drive train of the vehicle. A similar result is obtained if the speed variation is such that the control switch 86 does not operate, but the load as reflected in the main engine manifold is decreased to an extent such that as the manifold switch 82 is opened, either one of these controls 82 or 86 being operable to stop the auxiliary engine. Similarly, both of the controls 82 or 86 must operate in response to predetermined conditions to start the auxiliary engine under decreasing speed and full load conditions on the main engine.

It is therefore apparent that with such a control system the operation of the auxiliary engine is entirely automatic and cannot be influenced by the driver of the vehicle. As a result, it can be set for given conditions of operation, and unauthorized operation of the auxiliary engine can be eliminated. This is desirable in that the primary function of the auxiliary engine is to maintain a certain minimum speed of the vehicle in climbing grades, which purpose might be defeated if it was made subject to the variable control of the operator.

The function of the control relay 83 when used in the circuit shown in Figure 5 is to shunt the manifold switch 82 so that the governor controlled switch 86 will have sole control of the cutting out of the booster engine 25. In other words, the relay 83 is so arranged as to shunt the manifold switch 82 after the booster engine has been started so that the sole control for the cutting out of the booster engine is the governor controlled switch 86 responsive to the speed of the rotation of the propeller shaft 16. When the booster engine is cut out, the relay 83 operates to remove the shunt around the manifold control switch 82 so that it can function in order to require that both conditions controlled by the manifold switch 82 and the governor switch 86 must be secured before the booster engine can again be started.

In the control circuit shown in Figure 6 a simplified arrangement is provided. The battery 89 for the booster engine has one terminal thereof connected through the line 112 to one terminal of the starting switch box 96. From the switch box the starting current is led through the conductor 113 to the starting motor 98. A branch conductor from the conductor 112, indicated at 114, is connected to the generator 93 and by the conductor 115 to one terminal of the control circuit for the starting switch box, another terminal of this starting switch box being connected through the conductor 116 to the high tension coil 100, and also to the accelerator switch 117. The switch is controlled through suitable linkage connected to the accelerator pedal 108, and when closed, energizes a circuit from the battery through the switch 117 and the conductor 118 to a combination solenoid actuated accelerator control 119, which has a vacuum control arrangement connected through the vacuum line 120 to the fuel and vacuum pump 122 mounted at the main engine 19. This vacuum control is arranged to control the speed of the carburetor opening through the linkage 123 to the carburetor 124 on the booster engine. A suitable needle valve 125 is provided for regulating this speed of opening of the carburetor. The other terminal of the accelerator control 119 is connected through the line 126 back to the starter motor circuit.

The manifold control switch 82 similar to the switch shown in Figure 5 has one terminal thereof connected through the conductor 128 to a governor control or breaker switch mechanism 129, which is shown more in detail in Figure 7. The other terminal of the manifold control or breaker switch 82 is connected through the line 130 to a second terminal on the governor controlled or breaker switch mechanism 129. These two terminals are respectively indicated at 132 and 133. A suitable ignition switch 134 and auxiliary switch 135 are connected between the terminal 136 of the governor control and battery connection 112. The ignition switch 134 is manually operable to prevent the booster engine 25 from being started when it is stopped and for disconnecting and stopping the same when it is running. There is also a connection from the conductor 116 through the conductor 137 to the terminal 138 of the governor control mechanism 129.

This governor control mechanism comprises a series of four contact mechanisms 140, 141, 142 and 143, which are adapted to be closed mechanically through a suitable speed responsive mechanism at speeds of 9, 20, 10 and 35 miles per hour, respectively, in a particular embodiment of the invention, it being understood of course that these limits may be varied as desired by suitable variation of the control. Closing of the contacts 141 and 143 results in energization of a relay 145, which in turn closes a circuit between contacts 146, thereby energizing the mechanism to cut out the circuit through the ignition switch and one side of the line leading to the manifold control switch 82. The other side of this line is opened due to the open circuit between contacts 148. This in turn opens the circuit from the terminal 133 to the terminal 138, through which power is supplied to the circuit including the accelerator control switch 117. As a result, if and when the manifold control switch 82 is energized due to full load conditions at the main engine 19, the starting circuit is not energized for the booster engine, since the vehicle is travelling at a speed greater than 35 miles per hour.

In place of the relay 83 used in the circuit shown in Figure 5, the governor control mechanism 129 in itself therefore has means for cutting out the influence of the manifold control switch 82 so that cutting out of the booster engine is entirely dependent upon the speed of the vehicle. This is effected through the relay 147 and the series of contacts 140, 141, 142 and 143, which function to prevent power supply to the manifold switch when the speed is between 20 and 35 miles per hour.

In the operation of the circuit shown in Figure 6, when the speed of the vehicle is above 35 miles per hour, the booster engine is cut out and cannot be started due to the fact that relay 145 is energized, thereby opening the circuit to the manifold control switch so that this switch cannot effect any control over the operation of the booster engine. However, when the speed of the vehicle drops below 35 miles per hour, the contacts 143 are separated, but relay 145 remains energized, closing the circuit from one of the contacts 146 to ground through the relay and contacts 141, which in turn maintains the circuit to the manifold switch and also to the accelerator control switch open.

When the speed drops below 20 miles per hour, contacts 141 open, de-energizing relay 145, and thereby closing contacts 148 to complete a circuit through contacts 142 to terminal 133. Under such circumstances, if the manifold conditions indicate full load on the booster engine, the booster engine is energized by completion of the starting circuit through the manifold switch and the booster engine comes into operation. However, as soon as the speed of the vehicle exceeds 35 miles per hour, closing contacts 143, the relay 145 is again energized cutting out the battery circuit and opening the circuit through the manifold switch so that at speeds above 35 miles per hour the manifold switch in itself cannot control the starting of the booster engine. Similarly, at speeds below 20 miles per hour, the contacts 141 and 143 are opened, again de-energizing relay 145, but in this case the circuit to the manifold control switch is maintained by reason of the closure of contacts 142 and deenergization of relay 145 which in turn allows contacts 148 to close. Under such conditions, however, the starting circuit can again be energized because the speed is below that at which the governor control mechanism 129 will cut out the booster circuit.

It will therefore be apparent that with this control circuit, the booster engine will be started only in response to a full load condition at the main engine with a speed below 20 miles per hour. As soon as the speed of the vehicle reaches 35 miles per hour the governor control mechanism operates to cut off the booster engine and also deenergizes the circuit through the manifold control switch. In order to prevent starting of the booster engine under slow speeds when moving away from standing position in low gear ratios, the contacts 140 and 142 are provided, which contacts do not close until respective speeds of 9 and 10 miles per hour have been reached, and the manifold switch 82 will not operate between 10 and 20 miles per hour except under full throttle conditions.

It is therefore believed apparent that I have provided a novel type of vehicle in which a supplemental power source is available for use in maintaining a predetermined speed of the vehicle under conditions where the main power source of the vehicle is not capable of maintaining such speed by itself, and which is not under the control of the operator but is entirely automatic in operation with suitable provisions being made for preventing operation of the booster engine during very low gear ratio movements of the vehicle.

I am aware that various changes may be made in certain of the details of the present invention, and I therefore do not intend to be limited to the specific control mechanisms and arrangements of the constituent parts, except as defined and limited by the scope and spirit of the appended claims.

I claim:

1. In a vehicle, a main engine, drive means for said vehicle driven by said main engine, a booster engine, means for connecting said booster engine to said drive means, an overrunning clutch in said connecting means operative to effect clutching engagement only when said booster engine comes up to full speed, and means responsive to the throttle position and the speed and load conditions of the main engine for starting the booster engine and bringing the same up to full speed.

2. In a vehicle, a main engine, a rear axle, drive means between said engine and said axle, a booster engine, means including an overrunning clutch for connecting said booster engine to said drive means, and speed-responsive means in said drive means operable to prevent operation of said booster engine except throughout certain speed ranges of said vehicle.

3. The combination, in a vehicle having a main engine, vehicle drive means connected thereto, and a booster engine adapted to be operatively connected into said drive means under certain conditions, of control means therefor comprising a first control mechanism responsive to predetermined load conditions at the main engine, a second control mechanism responsive to predetermined speeds of the vehicle, a starting circuit for the booster engine energized upon actuation of both said mechanisms, and means for cutting out said first control mechanism when the booster engine starts whereby stopping of the booster engine is dependent solely upon said second control mechanism.

4. The control means of claim 3 further characterized in the provision of means controlled by the throttle position of the main engine for bringing the booster engine up to full speed whenever it is in operation and for idling the booster engine whenever the main engine is idled during a period of operation of the booster engine.

5. The control means of claim 3 further characterized in that said second control mechanism includes means for cutting out said first control mechanism above a predetermined speed of the vehicle and maintains said second control mechanism inoperative until the speed of the vehicle decreases below a predetermined speed lower than said predetermined cut out speed.

6. The control means of claim 3 further characterized by means responsive to a predetermined open throttle position at said main engine for progressively opening the throttle of the booster engine when the starting circuit thereof is energized.

7. The combination of claim 3 further characterized in the provision of means preventing operative connection of the booster engine into the drive means until the booster engine is at full speed.

8. Control means for a booster engine system in a vehicle having a main engine, a drive train, and a booster engine adapted to be connected to the drive train under predetermined conditions to supplement the torque of the main engine, comprising a starting circuit for the booster engine, a first switch in said circuit responsive to full load conditions at said main engine, a second control switch responsive to the speed of the vehicle, closing of both said switches energizing said starting circuit, and means for preventing operative connection of the booster engine to said drive train until the booster engine comes up to full speed.

9. The control means of claim 8 including means responsive to the throttle position at the main engine for bringing the booster engine up to speed upon energization of the starting circuit.

10. In a vehicle having a main engine, driving means connected thereto, and a booster engine having means for connecting it to said driving means only when operating under full speed, the combination of a first control mechanism responsive to predetermined load conditions at the main engine, a second control mechanism responsive to the speed of said vehicle and including means rendering said first mechanism inoperative above a predetermined vehicle speed, means in said second control mechanism conditioning said first control mechanism for operation when the vehicle speed drops a predetermined amount below said predetermined speed, means responsive to operation of said first control mechanism for starting said booster engine, and means in said second control mechanism rendering the same inoperative at speeds below a predetermined minimum speed.

11. A control system for a booster engine adapted to supplement the torque of the main engine of a vehicle comprising a control mechanism responsive to the speed of the vehicle including means rendering the entire system inoperative below a predetermined minimum speed and above a predetermined maximum speed, a load responsive mechanism at said main engine, means in said speed responsive mechanism conditioning said load responsive mechanism for operation only in a vehicle speed range from said minimum speed to a speed a predetermined amount below said maximum speed, means responsive to actuation of said load responsive mechanism in said range for starting said booster engine, and means responsive to the throttle position at said main engine for controlling the throttle position at said booster engine.

12. In a vehicle having a throttle controlled main engine, a throttle controlled booster engine, and driving means normally driven from said main engine, the combination of control means for connecting said booster engine into said driving means to supplement the torque of the main engine, comprising speed responsive mechanism inoperative below a predetermined minimum speed and above a predetermined maximum speed, a load responsive mechanism controlled by said speed responsive mechanism and conditioned thereby for operation only in a speed range between said minimum speed and a predetermined speed lower than said maximum speed, means actuated by said load responsive mechanism for starting said booster engine, and means controlled jointly by the throttle position at said main engine and said load responsive mechanism for opening the booster engine throttle upon actuation of said starting means.

13. The combination of claim 12 further characterized in the provision of automatic means for clutching said booster engine to said driving means only after said booster has come up to full speed.

14. The combination of claim 12 further characterized in that said throttle control means connects said booster engine to said driving means only when said main engine throttle is substantially fully open and said main engine is under substantially full load in said speed range, said speed responsive mechanism including means for maintaining said booster engine operating under such conditions only until said maximum speed is attained.

15. In combination, a vehicle including a main engine and a booster engine, an ignition and a starting circuit for said booster engine, a manifold switch and a throttle switch at the main engine each adapted to be closed under substantially full load conditions at the main engine, means connecting said manifold switch to said starting circuit, throttle controlling means at the booster engine connected to said throttle switch, and a speed responsive mechanism connected between said switches and said circuits for controlling the starting and operation of the booster engine in accordance with vehicle speed and load conditions at the main engine.

16. The combination of claim 15 wherein said speed responsive mechanism includes means for rendering said booster engine inoperative below a predetermined minimum speed and above a predetermined maximum speed.

17. The combination of claim 15 wherein said speed responsive mechanism includes means rendering said switches and circuits inoperative below a predetermined minimum speed and conditions said manifold switch for operation only in a range between said minimum speed and a predetermined speed, and means controlled by said mechanism for completing a circuit between said throttle switch and said ignition circuit only throughout a range between said minimum speed and a predetermined maximum speed.

18. In combination, a vehicle chassis having a main engine and propelling means, a secondary booster engine normally at rest, means for starting said booster engine from rest, a clutch for coupling said booster engine to said propelling means, and interlocking means responsive to speed of a main-engine-driven element and also to some part of the induction system of said main engine for automatically actuating said starting means to start the booster engine from rest and clutching said booster engine to said propelling means whereby said booster engine assists said main engine in driving the vehicle.

19. In combination, a main power unit having a transmission, a supplemental power unit having clutch means operable to couple it to said transmission, said supplemental unit having a starting circuit and a throttle, and interlocking control means between said units for energizing said supplemental unit starting circuit, opening said throttle and engaging said clutch responsive to predetermined combined throttle and speed conditions at said main unit above a predetermined minimum speed.

20. In combination, a main engine, a supplemental engine having a starting circuit and an ignition circuit, means responsive to predetermined speed and load conditions at said main engine for energizing both said circuits, and means at said supplemental engine responsive to starting thereof for independently deenergizing said starting circuit.

21. The combination, with a vehicle having a main engine and an auxiliary engine having a starting circuit adapted to be energized upon predetermined speed and load conditions at said main engine, of means responsive to starting of said auxiliary engine for independently deenergizing said starting circuit.

22. In an automotive vehicle provided with a power plant having a master engine, a booster engine and a throttle for in part controlling the operation of said booster engine, booster engine control mechanism including a breaker switch mechanism comprising a plurality of power operated switches, power means for operating said switches including a governor mechanism operative in accordance with the speed of the vehicle, a breaker switch wired to said breaker switch mechanism, an intake manifold vacuum operated motor for closing said breaker switch when the gaseous pressure within the intake manifold of said master engine is increased to a predetermined factor, and means, rendered operative by the closing of said breaker switch and a certain switch closing operation of said breaker switch mechanism, for cranking said booster engine and opening the afore-mentioned throttle.

23. In an automotive vehicle provided with a power plant including a master engine and a booster engine, means for controlling the operation of said master engine including a throttle, means, including a starting motor and a throttle, for cranking said booster engine and controlling the speed thereof, and automatically operable means for operating and controlling the operation of said second-mentioned means including a starter control unit for in part controlling the operation of said starting motor, a pressure differential operated motor operably connected to the booster engine throttle, a valve for controlling the operation of said pressure differential operated motor, a solenoid for actuating said valve, means for controlling the operation of said solenoid and starter control unit including a plurality of switches, and further including means, operable when the vehicle is traveling at certain speeds and the master engine throttle is sufficiently open to bring the gaseous pressure within the master engine intake manifold nearly up to atmospheric to so actuate said switches as to make possible an operation of said starter control unit and valve operating solenoid.

24. In combination, a main power unit, a supplemental power unit, a transmission common to said units, a clutch between each of said units and said transmission, a starting circuit for said supplemental unit, and means operable to energize said circuit and engage the clutch of said supplemental power unit to start the same and simultaneously connect it to the transmission in response to predetermined power requirements of said main unit.

25. In combination, a vehicle chassis having a main engine and propelling means, a secondary booster engine normally at rest, means for starting said booster engine from rest, a clutch for coupling said booster engine to said propelling means, and magnetic interlocking means responsive to speed of a main-engine-driven element and also to some part of the induction system of said main engine for automatically actuating said starting means to start the booster engine from rest and clutching said booster engine to said propelling means whereby said booster engine assists said main engine in driving the vehicle.

26. In combination, a vehicle chassis having a main engine and propelling means, a secondary booster engine normally at rest, means for starting said booster engine from rest, a clutch for coupling said booster engine to said propelling means, and interlocking means responsive to speed of a main-engine-driven element and also to some part of the induction system of said main engine for automatically actuating said starting means to start the booster engine from rest and clutching said booster engine to said propelling means whereby said booster engine assists said main engine in driving the vehicle, said interlocking means being inoperative below a predetermined minimum speed.

27. In combination in an automotive vehicle, a main engine unit, a battery, propelling means, a supplemental engine unit, means for connecting said supplemental unit to said propelling means, starting and ignition circuits connected to said battery for the supplemental unit, means responsive to predetermined minimum speed of a main-engine-driven element and responsive to the throttle of the main engine and responsive to predetermined higher speed for conditioning said circuits for operation which circuits when conditioned start the supplemental unit from rest and connect it to the propelling means.

28. In combination in a vehicle, a main engine power unit, propelling means, a battery, a supplemental engine power unit, means for connecting said supplemental unit to said propelling means, starting means for said supplemental unit, a circuit from said battery to said starting means, a second circuit from said battery to the ignition system of said supplemental power unit, and automatic means controlled jointly by the throttle of the main unit and speed of a main-engine-driven element for controlling the connection of these circuits to said starting means and to said supplemental unit ignition for starting said supplemental unit and connecting it to the propelling means.

29. In combination in a vehicle, a main power unit, a battery, a propelling means, a supplemental power unit, means for connecting said supplemental power unit to said propelling means, a circuit from said battery to the ignition system of the supplemental unit, and automatic means responsive to speed of a main power unit driven element for opening said ignition circuit, stopping said supplemental unit and disconnecting it from said propelling means.

30. In an automotive vehicle including a plurality of engines and propelling means, means for independently connecting said engines to said propelling means, control means for independently controlling the power output of one of said engines during normal operation thereof, means controlled by movement of said control means towards full power position and to a predetermined point in the range of movement of said control means to connect a second engine to the propelling means, and means arranged to prevent disconnection of said second engine during subsequent opposite movement of said control means towards low power position from said predetermined point.

31. In an automotive vehicle including a plurality of engines and propelling means, means for independently connecting said engines to said propelling means, control means for independently controlling the power output of one of said engines during normal operation thereof including a throttle, means controlled by movement of said throttle towards full power position and to a predetermined point in the range of movement of said throttle to connect a second engine to the propelling means, and means arranged to prevent disconnection of said second engine during subsequent opposite movement of said throttle towards low power position from said predetermined point.

32. In an automotive vehicle including a plurality of engines and a propelling means, means for independently controlling the power output of one of said engines during normal operation thereof, means operated by an increase in speed to a predetermined point for disconnecting at said predetermined point a second of said engines from said propelling means, including magnetic means arranged to prevent said last means from connecting said second engine by subsequent decrease in speed below said predetermined point.

33. In an automotive vehicle including a plurality of engines and a propelling means, means for independently controlling the power output of one of said engines during normal operation thereof, means operated by a decrease in speed to a predetermined point for disconnecting at said predetermined point a second of said engines from said propelling means, including magnetic means arranged to prevent said last means from connecting said second engine by subsequent increase of speed above said predetermined point.

34. In combination, a vehicle chassis having a main engine and propelling means, a secondary booster engine normally at rest, means for starting said booster engine from rest, a clutch for coupling said booster engine to said propelling means, interlocking means responsive to speed of a main engine driven element and also to some part of the induction system of said main engine for automatically actuating said starting means to start the booster engine from rest, and clutching said booster engine to said propelling means, whereby said booster engine assists said main engine in driving the vehicle, and electrically controlled relay means operable only after said main engine driven element has attained a predetermined minimum speed for conditioning said interlocking means for operation in response to predetermined combined speed and induction system conditions at said main engine.

35. In combination, a vehicle chassis having a main engine and propelling means, a secondary booster engine normally at rest, means for starting said booster engine from rest, an overrunning clutch for coupling said booster engine to said propelling means, and interlocking means responsive to speed of a main-engine-driven element and also to some part of the induction system of said main engine for automatically actuating said starting means to start the booster engine from rest and clutching said booster engine to said propelling means whereby said booster engine assists said main engine in driving the vehicle.

36. In combination, a vehicle chassis having a main engine and propelling means, a secondary booster engine normally at rest, means for starting said booster engine from rest and becoming inoperative when the booster engine starts, a clutch for coupling said booster engine to said propelling means, and interlocking means responsive to speed of a main-engine-driven element and also to some part of the induction system of said main engine for automatically actuating said starting means to start the booster engine from rest and clutching said booster engine to said propelling means whereby said booster engine assists said main engine in driving the vehicle.

37. In combination in a vehicle, a manually controlled main power unit, a battery, a propelling means, a supplemental power unit, means for connecting said supplemental unit to said propelling means, an electric starting means for said supplemental unit, a circuit from the battery to said starting means, a circuit from the battery to the ignition system of said supplemental unit, switches to control the energizing of said circuits to actuate said starting means to start the supplemental unit and connect it to the propelling means including one switch set to operate at a perdetermined low speed of the vehicle, a second switch to operate at a predetermined higher speed of the vehicle, and a third switch to operate by a predetermined throttle position of the main power unit.

38. In combination, in a vehicle, a manually controlled main power unit, a battery, a propelling means, a supplemental power unit normally at rest, means for connecting said supplemental unit to said propelling means, an electric starting means for starting said supplemental unit from rest, a circuit from the battery to said starting means, a circuit from the battery to the ignition system of said supplemental unit, switches to control the energizing of said circuits to actuate said starting means to start the supplemental unit from rest and connect it to the propelling means including switches set to operate at a predetermined low speed of the vehicle, to operate at a predetermined higher speed of the vehicle, and to operate by a predetermined intake manifold vacuum of the main power unit, the closing of all of said control switches, being required before starting and ignition circuits of said supplemental units are energized to start said supplemental unit from rest and connect it to said propelling means.

39. In combination, in a vehicle, a main power unit, a battery, a propelling means, a booster power unit normally at rest, starting means for starting said booster unit from rest, means for connecting said booster power unit to said propelling means, a circuit from said battery to the ignition system of the booster unit, and automatic means responsive to the speed of a main power unit driven element for controlling the connection of said ignition system and for automatically starting and connecting said booster power unit to said propelling means and for stopping and disconnecting the booster power unit from said propelling means, and manual means controllable by the operator arranged to prevent the booster power unit from being started if the booster power unit is stopped and to disconnect and stop the booster power unit if it is running.

40. In an automotive vehicle including a plurality of engines and a propelling means, means for independently manually controlling the power output of one of said engines during normal operation thereof, means operated by a decrease in speed to a predetermined point for connecting at said predetermined point a second of said engines to said propelling means, including magnetic means arranged to prevent said last means from disconnecting said second engine by subsequent increase of speed above said predetermined point.

41. In an automotive vehicle including a plurality of engines and a propelling means, means for independently controlling the power output of one of said engines during normal operation thereof, means operated by an increase in speed to predetermined point for connecting a second of said engines to said propelling means, including magnetic means arranged to prevent said last means from disconnecting said second engine by subsequent decrease of speed below said predetermined point.

42. The combination of claim 38 further characterized by means to cause at least one of said switches to open under a different vehicle speed condition from that at which it is set to close.

43. A control system for a booster engine adapted to supplement the torque of the main engine of a vehicle comprising a control mechanism responsive to the speed of the vehicle including means rendering the entire system inoperative below a predetermined minimum speed and above a predetermined maximum speed, a load responsive mechanism at said main engine, means in said speed responsive mechanism conditioning said load responsive mechanism under certain conditions for operation in a vehicle speed range from said minimum to said maximum and under other conditions will not be conditioned until said speed is a predetermined amount below said maximum speed, and means responsive to the throttle position at said main engine for controlling the throttle position at said booster engine.

44. A control system for a booster engine adapted to supplement the torque of the main engine of a vehicle comprising a control mechanism responsive to the speed of the vehicle including means rendering the entire system inoperative below a predetermined minimum speed and above a predetermined maximum speed, a load responsive mechanism at said main engine, means in said speed responsive mechanism conditioning said load responsive mechanism for operation in a vehicle speed range from said minimum to said maximum, and means responsive to the throttle position at said main engine for controlling the throttle position at said booster engine.

45. In a vehicle, a main engine, drive means for said vehicle driven by said main engine, a booster engine, means for connecting said booster engine to said drive means, an over-running clutch in said connecting means operative to effect clutching engagement only when said booster engine comes up to full speed and means responsive to the speed of the vehicle and load condition of the main engine for starting the booster engine and bringing it up to full speed, and means responsive to the throttle position of said main engine for controlling the operation of the booster engine.

46. The combination, in a vehicle having a main engine, vehicle drive means connected thereto, and a booster engine adapted to be operatively connected into said drive means under certain conditions, of control means therefor comprising a first control mechanism responsive to predetermined load conditions at the main engine, a second control mechanism responsive to predetermined speeds of the vehicle, a starting circuit for the booster engine energized upon actuation of both said mechanisms, and means for cutting out the first control mechanism when the booster engine starts whereby stopping of the booster engine is dependent solely upon said second control mechanism.

47. The control means of claim 46 further characterized in that said second control mechanism includes means for cutting out said first load control mechanism above a predetermined speed of the vehicle and maintaining said second control mechanism inoperative to cut in said first load control mechanism until the speed of the vehicle decreases below a predetermined speed lower than said predetermined cut out speed.

48. The control means of claim 46 further characterized by means responsive to a predetermined open throttle position at said main engine for progressively opening the throttle of the booster engine when the starting circuit thereof is energized.

49. The combination of claim 46 further characterized in the provision of means preventing operative connection of the booster engine into the drive means until the booster engine is at full speed.

DONALD D. ORMSBY.

REFERENCES CITED

The following references are of record in the file of this patent:

UNITED STATES PATENTS

| Number | Name | Date |
| --- | --- | --- |
| 2,000,709 | Matthews | May 7, 1935 |
| 2,132,450 | Wolf | Oct. 11, 1938 |
| 1,518,034 | Whiting | Dec. 2, 1924 |
| 1,849,212 | Winther | Mar. 15, 1932 |
| 1,954,206 | Hughes | Apr. 10, 1934 |
| 1,920,712 | Pilcher | Aug. 1, 1933 |
| 1,437,129 | Brown | Nov. 28, 1922 |
| 1,768,530 | Short | June 24, 1930 |
| 2,142,102 | Bailey et al. | Jan. 3, 1939 |
| 2,085,897 | Burrows | July 6, 1937 |